(12) United States Patent
Nakamura

(10) Patent No.: US 6,785,941 B2
(45) Date of Patent: Sep. 7, 2004

(54) METHOD FOR MANUFACTURING MULTI LAYER CERAMIC COMPONENTS

(75) Inventor: Toshiya Nakamura, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 254 days.

(21) Appl. No.: 10/008,874

(22) Filed: Nov. 8, 2001

(65) Prior Publication Data

US 2002/0039273 A1 Apr. 4, 2002

Related U.S. Application Data

(62) Division of application No. 09/536,547, filed on Mar. 28, 2000, now Pat. No. 6,349,026.

(30) Foreign Application Priority Data

Mar. 29, 1999 (JP) .............................. 11-85290
Oct. 18, 1999 (JP) ........................... 11-295001

(51) Int. Cl.$^7$ .............................................. H01G 7/00
(52) U.S. Cl. .................... 29/25.42; 29/25.41; 29/25.35; 29/25.03; 29/830; 361/321.2; 361/321.4; 501/32; 501/136
(58) Field of Search ...................... 29/830, 593, 602.1, 29/25.41, 25.42, 885, 846, 611, 612, 849; 361/321.2, 313, 309, 303, 320; 501/136, 137, 32; 174/261, 264, 262; 257/698, 774

(56) References Cited

U.S. PATENT DOCUMENTS 5,822,176 A * 10/1998 Sano et al. ............... 361/321.4
6,331,932 B1 * 12/2001 Kobayashi et al. ...... 361/321.2
6,349,026 B1 * 2/2002 Nakamura .................. 361/303
6,370,014 B1 * 4/2002 Yoneda ..................... 29/25.41
6,442,813 B1 * 9/2002 Sakamoto et al. ......... 29/25.42

FOREIGN PATENT DOCUMENTS

JP           8-130149      *  5/1996
JP        2000-216046      *  8/2000

* cited by examiner

*Primary Examiner*—Minh Trinh
(74) *Attorney, Agent, or Firm*—Flynn, Thiel, Boutell & Tanis, P.C.

(57) ABSTRACT

A method of manufacturing a multi-layer ceramic electronic part involves the steps of preparing an unbaked laminated body containing a ceramic layer and internal electrodes laminated on one another, applying and drying a conductor, into which is added a material common with a ceramic forming the ceramic layer of the laminated body, on edge portions of the unbaked laminated body, forming external electrodes in contact with the internal electrodes at end surfaces of the laminated body, and baking the laminated body.

8 Claims, 3 Drawing Sheets

METHOD FOR MANUFACTURING MULTI LAYER CERAMIC COMPONENTS

This is a division of Ser. No. 09/536,547, filed Mar. 28, 2000, now U.S. Pat. No. 6,349,026, issued on Feb. 19, 2002.

BACKGROUND OF THE INVENTION

1. Field of the Invention

The present invention relates to multi-layer ceramic electronic parts having, for example, a laminated body of internal electrode patterns and ceramic layers therein, at end portions of which are provided external electrodes so as to connect to the internal electrodes, and in particular to multi-layer ceramic electronic parts in which a material common with a ceramic material for forming the ceramic layers of the laminated body is added into at least a portion of the external electrodes, and further a manufacturing method thereof.

2. Description of Related Art

As electronic components of a laminated type can be listed, for example, a laminated capacitor, a laminated inductor, a laminated piezo element, a laminated filter, a ceramic multi-layer circuit board, etc.

For example, in a laminated ceramic capacitor being the most representative one of the laminated electronic components, a large number of layers are stacked or laminated, each having an internal electrode and made of dielectric material, wherein the above-mentioned internal electrodes are pulled out to the end surfaces of the laminated body opposing to each other and, on the end surfaces to which those internal electrodes are pulled out, are formed external electrodes, and those external electrodes are connected to the above-mentioned internal electrodes, respectively.

The above-mentioned laminated body 3 of the laminated ceramic capacitor has a layer construction as shown in FIG. 3, for example. Namely, the ceramic layers 7, 7 . . . , each having the internal electrode 5 or 6 and made of dielectric material, are laminated in an order as shown in the FIG. 3, and further on both sides (i.e., upper and lower sides) thereof are stacked or laminated the ceramic layers 7, 7 . . . in a plurality thereof, on which no electrode 5 or 6 is formed, respectively. Upon the end portions of the laminated body 3 having such a layer structure therein, the internal electrodes 5 and 6 are exposed to one another, and as shown in FIG. 1, the above-mentioned external electrodes 2 and 2 are formed at the end portions of this laminated body 3.

Such a laminated ceramic capacitor, ordinarily, is not manufactured one by one, or in a unit of one part as shown in FIG. 3, but actually is obtained with a manufacturing method which will described below. Namely, first of all, minute ceramic powder and organic binder are mixed to prepare a slurry, and it is extended thinly on a carrier film made from a polyethylene terephthalate film, etc., by means of doctor blade method. Then, it is dried to be formed into a ceramic green sheet. Next, this ceramic green sheet is cut out into a desired size by a cutting head, while being mounted on the supporting sheet, and is printed with a conductive paste on one side surface thereof by a screen printing method, and is dried. With this, the ceramic green sheets 1a and 1b are obtained, on each of which plural sets of the internal electrode patterns 2a and 2b are aligned or arranged in the vertical and horizontal directions, as shown in FIG. 4.

Next, plural pieces of the ceramic green sheets 1a and 1b, each having the above-mentioned internal electrode patterns 2a or 2b thereon, are stacked or laminated, and further are stacked several pieces of the ceramic green sheets 1, 1 . . . having no internal electrode 2a or 2b, at the top and the bottom thereof. They are compressed together, thereby to form the laminated body. Here, the above ceramic green sheets 1a and 1b are stacked on one another, on which the internal electrode patterns 2a and 2b are shifted by half of the length in a longitudinal direction thereof. After that, this laminated body is cut out into a desired size, thereby to manufacture laminated raw chips, and those raw chip are baked. In this manner are obtained the laminated bodies as shown in FIG. 3.

Next, this baked laminated body 3 is applied with a conductor paste on both ends thereof and is baked, and on the surface of the baked conductive film is treated a plating, thereby completing the laminated ceramic capacitor formed with the external electrodes at both ends thereof, as shown in FIG. 1.

The multi-layer ceramic electronic part, such as the laminated ceramic capacitor mentioned above, is mounted on a circuit board and is soldered at the external electrodes 2 and 2 on both ends thereof on land electrodes of the circuit board.

However, such a laminated ceramic capacitor generates thermal stress within the laminated body 3 due to heat-shock when being soldered at the external electrodes thereof or due to change of a circumference temperature under the condition of use after the soldering. With this thermal stress, in particular in an end portion of the external electrodes 2 and 2 of the laminated body 3, can easily occur cracks. The cracks occurring in the laminated body 3 bring about a lowering in insulation due to invasion of moisture inside and a lowering in static capacitance due to discontinuity of the internal electrodes 5 and 6, thereby causing a low reliability thereof.

Such a thermal stress causing the cracks in the laminated body occurs due to the difference in the thermal expansion ratio between the ceramic material, which is a main ingredient of forming the laminated body 3, and the conductor which is a main ingredient of forming the external electrodes 2 and 2. Then, conventionally, a measure was taken, into the conductor paste for forming the external electrodes 2 and 2 is added the ceramic material of forming the ceramic layer 7 as a common material, thereby to make small the difference between the ceramic layer 7 and the external electrodes 2 and 2 in the physical properties, such as the thermal stress therein.

However, if the common material, i.e., the ceramic material for forming the ceramic layer 7, is put or added into the conductor paste for forming the external electrodes 2 and 2 much, stickiness or adhesiveness of the external electrodes 2 and 2 onto the external electrodes 5 and 6 comes to be inferior, i.e., connecting resistance therebetween becomes large and also the electric properties thereof are deteriorated. Further the stickiness or adhesiveness onto the solder or Sn plating is also deteriorated. As a result of this, solder wetability of the external electrodes 2 and 2 comes to be inferior, therefore mis-mounting easily occurs when mounting the multi-layer ceramic electronic part(s) on the circuit board.

SUMMARY OF THE INVENTION

An object, according to the present invention, for solving the problem in the conventional art mentioned above, is to provide a multi-layer ceramic electronic parts, wherein cracks in the laminated hardly occur due to the heat-shock accompanying a change of temperature under the conditions of being soldered and of use thereafter, and further the adhesiveness between the external and internal electrodes and the adhesiveness of solder onto the external electrode are superior, as well, thereby also being superior in soldering property with the external electrodes.

According to the present invention, for achieving the above-mentioned object, pillar-like ceramic portions 22 extending in a direction of thickness of a conductor film 21 are scattered in the conductor films 21 of the external electrodes 2 and 2. Each ceramic portion contains a material common to the ceramic material forming the ceramic layers 7 of the laminated body 3. Therefore, it has a strong bonding power onto the ceramic layers 7 of the laminated body 3. On the other hand, the conductor layer 21 has a strong bonding power onto the internal electrodes 5 and 6 of the laminated body 3, and shows a good adhesiveness onto a plating film 24 on the surface thereof. With the conductor films 21 and the ceramic portions 22 scattered therein complementing each other in the characteristics thereof, it is possible to ensure the bonding power of the external electrodes 2 and 2 at the end portions and the adhesiveness with the plating thereof, and also to prevent from occurring the cracks within the laminated body 3.

Namely, according to the present invention, there is provided a multi-layer ceramic electronic part, comprising:

a laminated body 3 in which a ceramic layer 7 and internal electrodes 5 and 6 are laminated one another; and external electrodes 2 and 2 provided at end portions of the laminated body 3, in which the internal electrodes 5 and 6 oppose each other and reach to one of at least a pair of edges of the ceramic layer 7, thereby leading the internal electrodes 5 and 6 to one of the end surfaces of the laminated body 3 and connecting the internal electrodes 5 and 6 with the external electrodes 2 and 2, respectively. Wherein pillar-like ceramic portions 22, which are continuous in a direction of thickness of a conductor film 21 forming the external electrodes 2 and 2, are scattered in the conductor film 21.

The ceramic portions 22, containing the common material with the ceramic material forming the ceramic layers 7 of the laminated body 3, have a strong bonding power onto the ceramic layers 7 of the laminated body 3. Those ceramic portions 22 are formed so that they are continuous from an inner surface of the conductor film 21 of the external electrodes 2 and 2 where it is in close contact with a surface of the laminated body 3 up to an outer surface thereof.

According to the present invention, the conductor film 21 of the external electrodes 2 and 2 is made of at least one metal selected from a group of Ni, Cu, Ag, Pd and Ag—Pd, and the external electrodes 2 and 2 are baked at the same time as the baking of the laminated body 3.

In the multi layer ceramic electronic part, since the ceramic portions 22, containing the so-called common material therein, shows a good adhesiveness onto the ceramic layers 7 at the end portions of the laminated body 3, the adhesiveness of the external electrodes 2 and 2 can be maintained at the end portions of the laminated body 3. However, the ceramic portions 22 are in a pillar-like shape and are scattered in the external electrodes 2 and 2, the external electrodes 2 and 2 do not adhere to the ceramic layers 7 at the end portions of the laminated body 3, but rather adhere in a spot-like manner. Therefore, when a change occurs in temperature, the thermal stress occurring within the laminated body 3 is released or mitigated, accompanying the thermal expansion and/or shrinkage of the conductor films 21 of the external electrodes 2 and 2, thereby hardly bringing about the cracks within the laminated body 3.

On the other hand, the conductor films 21 being formed to enclose around the ceramic portions 22 shows a good adhesiveness with the internal electrodes 5 and 6 at the end surfaces of the laminated body. With this, the contact resistance between the external electrodes 2 and 2 and the internal electrodes 5 and 6 comes to be small, and at the same time, it is also difficult to cause an exfoliation of the conductor films 21 from the end surfaces of the laminated body 3, in particular, from the internal electrodes 5 and 6.

Further, by baking the external electrodes 2 and 2 at the same time when the laminated body 3 is baked, i.e., the baking of the so-called common material, which is contained in the conductor paste for forming the conductor films 21 of the external electrodes 2 and 2, in other words, the baking of the material for forming the ceramic portions 22 of the external electrodes 2 and 2, is performed at the same time as the baking of the laminated body 3. Therefore the ceramic portions 22 of the external electrodes 2 and 2 and the ceramic layers 7 of the laminated body 3 are baked as one body to obtain a strong adhesiveness therebetween.

In addition, the adhesiveness of the plating on surface sides of the external electrodes 2 and 2 is also good, therefore forming a fine plating film thereon, thereby obtaining a good adhesiveness with the solder.

As is mentioned previously, with the multi-layer ceramic electronic part, according to the present invention, not only the adhesiveness between the external electrodes 2 and 2 and the internal electrodes 5 and 6 at the end surfaces of the laminated body 3, but also the adhesiveness between the external electrodes 2 and 2 and the ceramic layers 7 becomes good. Also, the adhesiveness of the plating of solder or Sn is good upon the surfaces of the external electrodes 2 and 2. As a result of this, the wetability with solder of the external electrodes 2 and 2 is also good, thereby obtaining a high strength in soldering when the component is mounted.

Furthermore, thermal stresses hardly occur accompanying a change of temperature, therefore the cracks do not occur within the ceramic layers 7.

Such a multi-layer ceramic electronic part, according to the present invention, is obtained by the following steps of:

preparing a unbaked laminated body 3;

applying and drying a conductor paste, into which is added a material common with a ceramic forming the ceramic layers 7 of the laminated body 3, on the edge portions of the unbaked laminated body 3;

forming the external electrodes 2 and 2 so that they connect with the internal electrodes 5 and 6 at the end surfaces of the laminated body 3, by baking the laminated body 3; and completing the multi-layer ceramic electronic part.

As is mentioned previously, when baking the conductor paste containing the material common with the ceramic material for forming the ceramic layers 7 of the laminated body 3, due to bad wetability of the conductor powder with the ceramic particles when being melted within the conductor paste, the ceramic particles come together by themselves to form the ceramic portions 22 mentioned above, therefore they are scattered in the conductor films 21 of the external electrodes 2 and 2.

DESCRIPTION OF THE PREFERRED EMBODIMENTS

Hereinafter, detailed and concrete explanation of the embodiments according to the present invention will be given by referring to the attached drawings.

Explanation will be given on a laminated ceramic capacitor, as an example of a multi-layer ceramic electronic part, and on a method for manufacturing thereof.

First of all, a powder of dielectric ceramic material, such as barium titanate, for example, is dispersed into an organic binder, such as acryl or the like and dissolved into a solvent, such as ethanol, etc., to thereby prepare a ceramic slurry. This ceramic slurry is pasted or applied thinly, on a base film made from a polyethylene terephthalate film or the like, with a constant thickness, and is dried, thereby producing a film-like ceramic green sheet. After that, this ceramic green sheet is cut out into an appropriate size.

Figure 4:
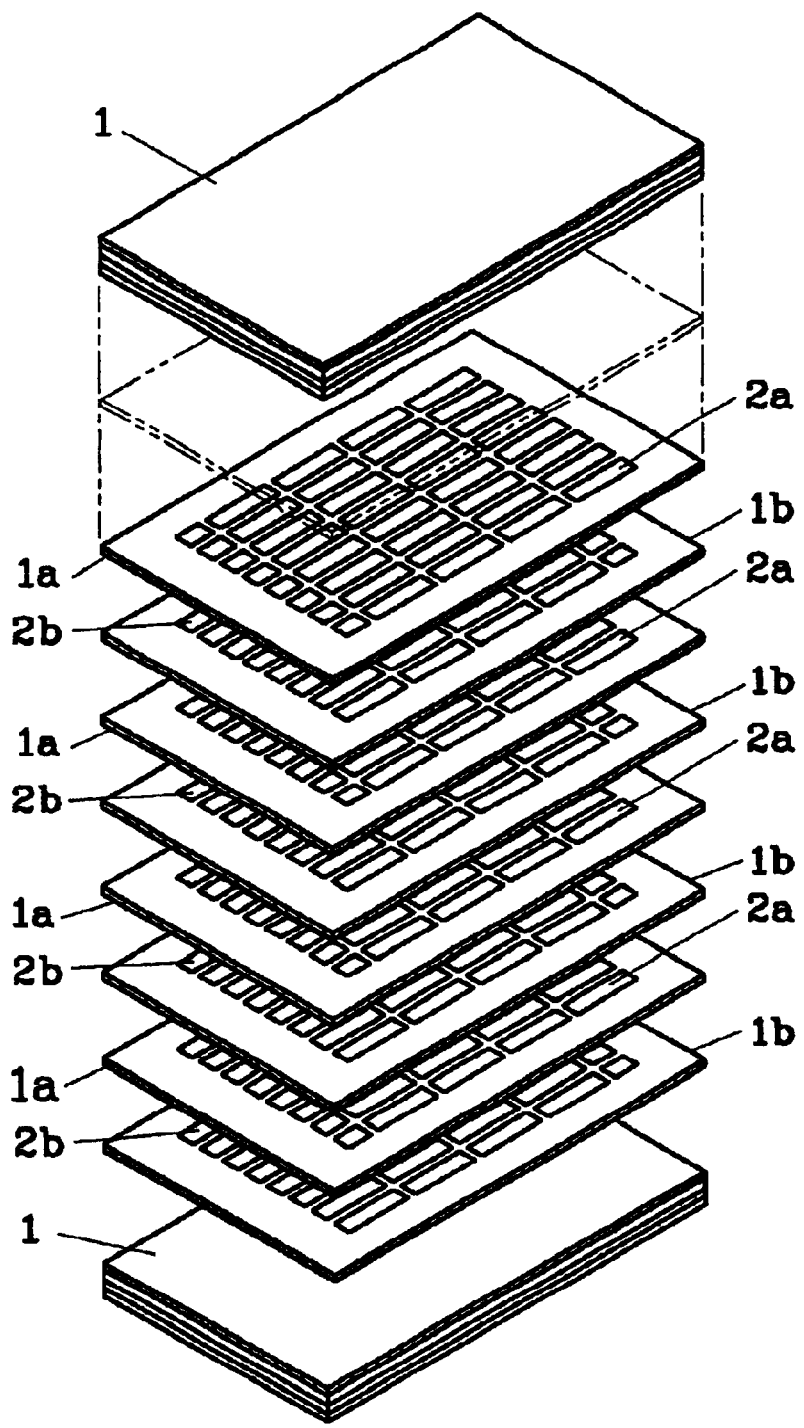
FIG. 4 is an exploded view for showing a condition of laminating of ceramic green sheets for manufacturing the multi-layer ceramic electronic part.

Next, as shown in FIG. 4, on the cut ceramic green sheets 1a and 1b, two (2) kinds of internal electrode patterns 2a and 2b are printed, respectively, with a conductor paste. For example, the conductor paste is obtained by adding 100 weight % of one kind of conductor power selected from Ni, Cu, Ag, Pd, Ag—Pd, 3–12 weight % of a binder selected from ethyl cellulose, acryl, polyester, etc., and 80–120 weight % of a solvent selected from butyl carbitol, butyl carbitol acetate, terpineol, ethylcellosolve, hydrocarbon, etc., and they are mixed and dispersed equally, to be applied.

The ceramic green sheets 1a and 1b, on which the internal electrode patterns 2a and 2b are printed, are stacked on one another, as shown in FIG. 4, and on both sides (i.e., an upper side and a lower side) thereof are further stacked with the ceramic green sheets 1 and 1, on which no internal electrode pattern 2a or 2b is printed, i.e., dummy sheets, and then they are compressed to obtain the laminated body. Further, this laminated body is cut in vertical and horizontal directions and separated into each of the chip-like laminated bodies. In the laminated body 3, the internal electrodes 5 and 6, opposing each other through the ceramic layer 7, are led out to both end surfaces of the laminated body 3, alternatively.

On the other hand, the paste is prepared for forming the external electrodes 2 and 2. For this conductor paste is used one which contains one kind of conductor powder and is selected from Ni, Cu, Ag, Pd, Ag—Pd, etc., in the same manner as when applying or printing the electrode patterns 2a and 2b. However, into the conductor paste is added a so-called a common material, i.e., a material common with the ceramic which forms the ceramic layers 7 of the laminated body 3.

For example, in a case where the conductor material contained in the conductor paste is Ni, the conductor paste is prepared by adding into 100 weight % of Ni powder, 3–12 weight % of ethyl cellulose as the binder, 80–120 weight % of the solvent, and 3–40 weight % of barium titanate powder as the so-called common material. If the conductor material contained in the conductor paste is Cu, Ag, Pd or Ag—Pd, the conductor paste is prepared in the same manner.

Next, upon both end surfaces of the unbaked laminate body, on which the internal electrode patterns 2a and 2b are led out, and also covering a portion of the side surfaces of the laminated body and continuous with both end surfaces thereof, the conductor paste mentioned above is applied or painted, and is dried. Thereafter, by baking those laminated bodies, the laminated bodies are baked, and at the same time is also baked the conductor paste forming the internal electrode patterns 2a and 2b and the conductor paste applied on the end portions of the laminated body. With this, there can be obtained the baked laminated body 3 having the layer structure as shown in FIG. 3, and having the external electrodes 2 and 2 at the end portions thereof.

Figure 1:
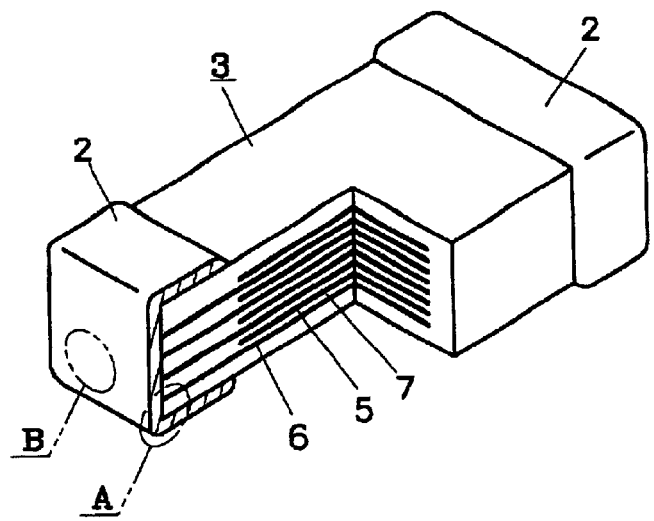
FIG. 1 is a perspective view of a multi-layer ceramic electronic part according to the present invention, a portion of which is cut out.
Figure 3:
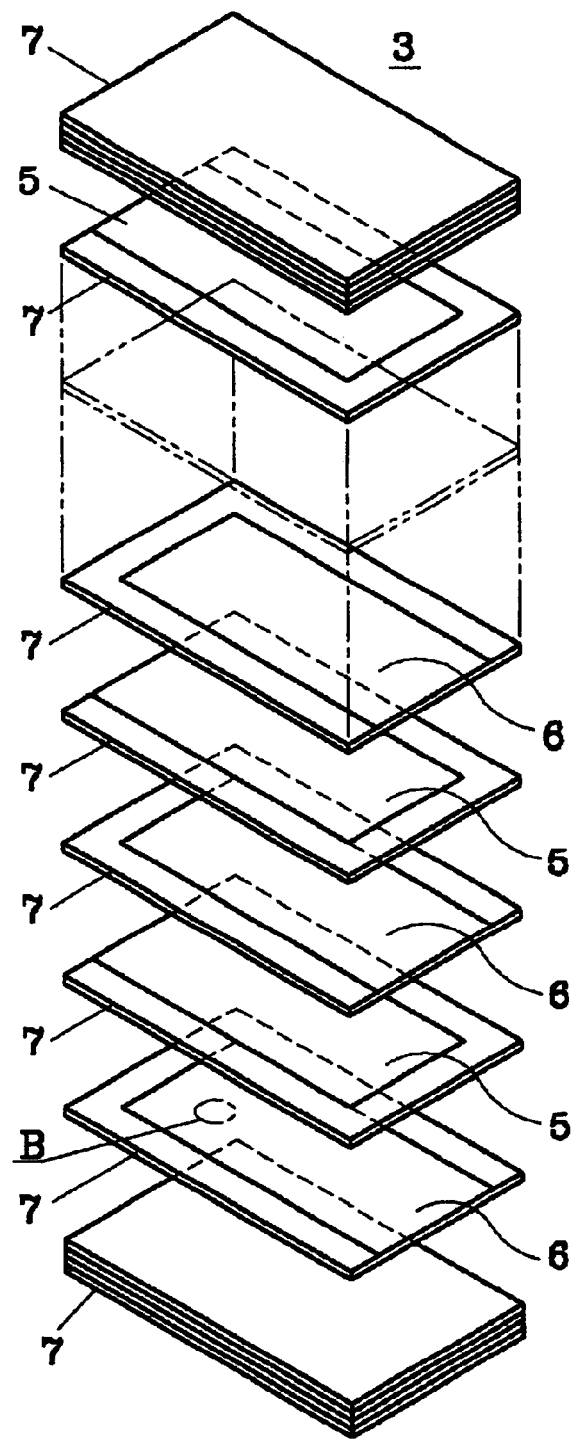
FIG. 3 is an exploded view for showing the layers of a laminated body, in an example of the above multi-layer ceramic electronic parts.

As shown in FIG. 3, the laminated body 3 are formed by laminating the ceramic layers 7, 7 . . . of dielectric material, each having an internal electrode 5 or 6, and further are laminated plural layers of the ceramic layers 7, 7 . . . on which no internal electrode 5 and 6 is formed, on both sides (i.e., upper or lower sides thereof), respectively. In the laminated body 3, the internal electrodes 5 and 6, opposing to each other through the ceramic layer 7, are led out one another on both end surfaces thereof. As shown in FIG. 1, by baking the conductor paste on both end surfaces of the laminated body 3 where the internal electrodes 5 and 6 are led out, the formed external electrodes 2 and 2 are connected to the internal electrodes 5 and 6.

In the manner mentioned above, when baking the conductor paste containing the common material with the ceramic material forming the ceramic layers 7 of the laminated body 3, first the conductor powder within the conductor paste melts, thereafter it begins to sinter and shrink. Namely, when it comes to be the temperature of starting of the sintering of the metal powder of the conductor paste, first the melting metal condenses and begins to shrink. When the metal is in the condition of melting, the ceramic particles have a bad wetability with the melting metal, therefore the melting metal and the ceramic particles are in the condition that they can be easily separated from each other. When the melting metal starts condensing under this condition, the common material scattered therein is pushed out. The common material which is pushed out comes together with the particles adjacent to each other when it comes up to the temperature of starting of the sintering of the ceramic, therefore it is formed in a pillar-like shape like stitching between the metal particles, and is extended to form the ceramic portion 22. The ceramic portion 22 formed in this manner, one of which reaches to a surface portion of a lower ceramic layer 7 of the external electrodes 2 and 2 to be connected therewith, and the other of which extends to the surfaces of the external electrodes 2 and 2. As a result of this, it comes to be the pillar-like ceramic portion extending from the surface of the laminated body 3 to the surfaces of the external electrodes 2 and 2. This ceramic portion 22 is scattered in the conductor film 21.

Figure 2:
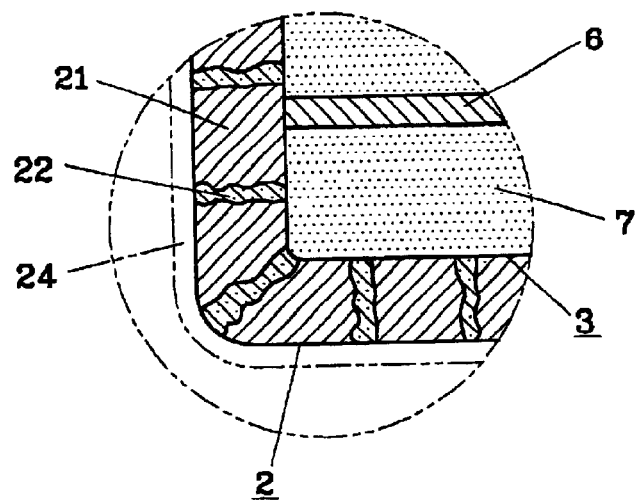
FIG. 2 is an enlarged cross-section view of a principle portion, in particular showing a portion A in the FIG. 1 of the above multi-layer ceramic electronic part.
Figure 2:
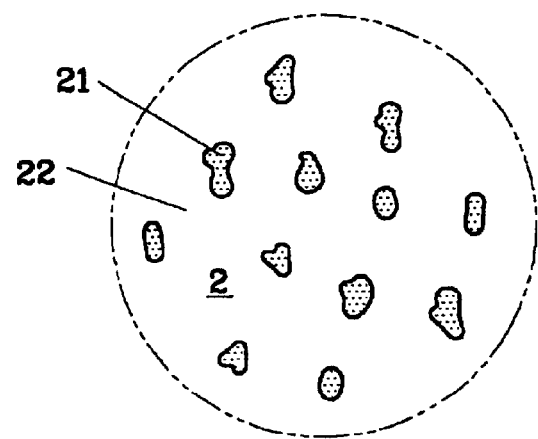

FIGS. 2 shows the cross-section of the external electrode 2 which is formed in this manner, in diagrammatic view, in particular, FIG. 2(a) shows an enlarged cross-section view of a portion corresponding to the portion A in FIG. 1, and FIG. 2(b) shows a view of the surface of the external electrode 2 corresponding to the portion B in FIG. 1. The condition of the external electrode 2, i.e., the cross-section and the surface thereof can be observed by an optical microscope, and FIGS. 2(a) and (b) show the diagrammatic view thereof.

As is shown in FIG. 2, the external electrodes 2 and 2 are formed by baking painted layers of the conductor paste on the end portions of the laminated body 3. In the conductor layer or film 21 of the external electrodes 2 and 2 are scattered the pillar-like ceramic portions 22, almost equally or uniformly in a plane direction, continuous in a direction of the thickness.

In the multi-layer ceramic electronic parts, since the ceramic portions 22, containing the so-called the common material therein, show a good adhesiveness onto the ceramic layers 7 at the end portions of the laminated body 3, the adhesiveness of the external electrodes 2 and 2 can be maintained at the end portions of the laminated body 3. However, the ceramic portions 22 are in a pillar-like shape and are in the condition of being scattered in the external electrodes 2 and 2, the external electrodes 2 and 2 do not adhere to the ceramic layers 7 at the end portions of the laminated body 3, but rather adhere in a spot-like manner. Therefore, when a change occurs in temperature, the thermal stress occurring within the laminated body 3 is released or mitigated accompanying the thermal expansion and/or shrinkage of the conductor layers 21 of the external electrodes 2 and 2, thereby hardly causing cracks within the laminated body 3.

Further, by baking the external electrodes 2 and 2 at the same time when the laminated body 3 is baked, i.e., the baking of the so-called common material, which is contained in the conductor paste for forming the conductor layers or films 21 of the external electrodes 2 and 2, in other words, the baking of the material for forming the ceramic portions 22 of the external electrodes 2 and 2 is performed at the same time as the baking of the laminated body 3. Therefore, the ceramic portions 22 of the external electrodes 2 and 2 and the ceramic layers 7 of the laminated body 3 are baked as one body.

On the conductor layer or film 21 formed in the manner mentioned above, the plating of Sn or solder is treated, and the external electrodes 2 and 2 are formed. Thereby, the multi-layer ceramic electronic part is completed. The portion which is indicated by an imaginary two-dot chain line in FIG. 2(*a*) shows the solder layer.

Though the explanation was given mainly on a laminated ceramic capacitor as one example of the multi-layer ceramic electronic part in the embodiment mentioned above, however, the present invention relating to a multi-layer ceramic electronic part can be also applied to, for example, a laminated ceramic inductor, a laminated ceramic LC composite part, a ceramic multi-layer wiring print board, etc.

What is claimed is:

1. A method for manufacturing a multi-layer ceramic electronic part comprising the steps of:

preparing an unbaked laminated body comprising a ceramic layer and internal electrodes laminated on one another;

applying and drying a conductor paste, into which is added a material common with a ceramic forming the ceramic layer of the laminated body, on edge portions of the unbaked laminated body;

forming external electrodes in contact with the internal electrodes at end surfaces of the laminated body;

baking the laminated body; and providing ceramic portions which are scattered in a conductor film forming the external electrodes and continuous in a direction of thickness of the conductor film.

2. The method of claim 1, additionally comprising the step of forming the conductor film of at least one metal selected from the group consisting of Ni, Cu, Ag, Pd and an Ag—Pd alloy.

3. The method of claim 1, wherein the ceramic comprises barium titanate.

4. The method of claim 1, wherein the conductor paste contains from 3% to 40% by weight of the common material.

5. A method for manufacturing a multi-layer ceramic electronic part comprising the steps of:

preparing an unbaked laminated body comprising a ceramic layer and internal electrodes laminated on one another;

applying and drying a conductor paste, into which is added a material common with a ceramic forming the ceramic layer of the laminated body, on edge portions of the unbaked laminated body;

forming external electrodes in contact with the internal electrodes at end surfaces of the laminated body;

baking the laminated body; and forming ceramic portions in the external electrodes that are continuous from an inner surface of a conductor film forming the external electrodes where the conductor film closely contacts with a surface of the laminated body, extending to an outer surface of the external electrodes.

6. The method of claim 5, additionally comprising the step of forming the conductor film of at least one metal selected from the group consisting of Ni, Cu, Ag, Pd and an Ag—Pd alloy.

7. The method of claim 5, wherein the ceramic comprises barium titanate.

8. The method of claim 5, wherein the conductor paste contains from 3% to 40% by weight of the common material.

* * * * *